(12) United States Patent
Ohlsson

(10) Patent No.: US 7,735,880 B2
(45) Date of Patent: Jun. 15, 2010

(54) QUICK JOINT COUPLING

(75) Inventor: Weimar Ohlsson, Surte (SE)

(73) Assignee: Weo Hydraulic AB, Surte (SE)

( * ) Notice: Subject to any disclaimer, the term of this patent is extended or adjusted under 35 U.S.C. 154(b) by 608 days.

(21) Appl. No.: 11/236,886

(22) Filed: Sep. 28, 2005

(65) Prior Publication Data

US 2006/0073721 A1 Apr. 6, 2006

Related U.S. Application Data

(63) Continuation of application No. PCT/SE2004/000456, filed on Mar. 25, 2004.

(30) Foreign Application Priority Data

Mar. 28, 2003 (SE) ..................................... 0300880

(51) Int. Cl.
*F16L 17/00* (2006.01)
(52) U.S. Cl. .................................. 285/340; 285/272
(58) Field of Classification Search ................ 285/272, 285/275, 340, 307, 276, 345, 321
See application file for complete search history.

(56) References Cited

U.S. PATENT DOCUMENTS 2,812,960 A * 11/1957 Walsh ......................... 285/276
4,223,919 A * 9/1980 Kurachi ....................... 285/272
4,606,564 A * 8/1986 Kurachi ....................... 285/248
6,129,390 A * 10/2000 Ohlsson ....................... 285/307

FOREIGN PATENT DOCUMENTS

| DE | 3546413 | 7/1987 |
|---|---|---|
| EP | 0375674 | 12/1988 |
| EP | 1070898 | 7/2000 |
| WO | 9635906 | 11/1996 |
| WO | WO02/097316 | 12/2002 |

* cited by examiner

*Primary Examiner*—Aaron M Dunwoody
(74) *Attorney, Agent, or Firm*—Gauthier & Connors LLP

(57) ABSTRACT

The present invention relates to a quick joint coupling for liquid tight joining of lines under high pressure and comprising a sleeve shaped female part and a male part being introducible into the female part. A male part related to the female part comprises a cylindrical part being introducible into the female part of an envelope surface of which presents a first groove having a certain width. The first groove receives a ring being axially displaceable between the two walls of the groove, which the ring has substantially the same thickness as the depth of the first groove, and which the female part comprises a cylindrical space for receiving the cylindrical part of the male part. The envelope surface of the space is provided with at least a second groove for receiving elastically movable locking means out off and into the cylindrical part.

11 Claims, 5 Drawing Sheets

QUICK JOINT COUPLING

"This is a continuation of copending application(s) International Application PCT/SE04/000456 filed on 25 Mar. 2004 and which designated the U.S."

BACKGROUND OF INVENTION

1. Field of Invention

The present invention relates to a quick joint for liquid tight joining of lines under high pressure and comprising a sleeve shaped female part and a male part being introducible into said female part, whereby a male part related to the female part comprises a cylindrical part being introducible into the female part the envelope surface of which presents a groove having a certain width, which groove receives a ring being axially displaceable between the two walls of the groove, which ring has substantially the same thickness as the depth of the groove, and which female part comprises a cylindrical space for receiving the cylindrical part of the male part, the envelope surface of said space is provided with at least a groove for receiving elastically movable locking means out off and into the cylindrical part, which means in a locking position cooperates with the edge of the groove being situated closest to the outer end of the male part and which locking means are displaceable out off their locking position by an movement of the ring towards said outer end edge, which movement is made possible by pressing the male part into the female part until the locking means are brought into a frictional engagement with the outer side of the ring. In particular the invention relates to the female part of such a quick joint.

2. Description of Related Art

A quick joint according to above is known from EP 0 375 674 and is provided with a ring of spring steel. Such a ring of spring steel provides for a necessary locking at normal hydraulic applications but there is a risk that it will become deformed at extremely high hydraulic pressures. If the locking ring is given larger dimensions in order to withstand higher loads it will become much harder to mount the ring in its groove within the female joint part.

PCT/SE96/00593 discloses a quick joint of the type given above, as well, wherein a ring shaped flange is coaxially arranged on the outer side of the groove of the envelope surface for receiving locking means being elastically movable out off and into the cylindrical space, and wherein the locking means comprises at least three arc shaped segments arranged in said groove which segments are forced into a an angular position by an elastic element to take a locking position in relation to the symmetrical longitudinal axis of the female part, in which angular position the segments together takes the shape of a truncated cone which supports with its broader base against the outer side of the groove of the female part, radially on the outer side of the flange.

These known quick joints become in order to be tight, torsional rigid, which means that those hoses which are connected to the joint will take much of optional rotational movements, such as e.g., at hydraulically operated timber-cutting apparatuses where a front cutting head is rotated in several different planes to facilitate cutting, delimbing and lumber distribution.

BRIEF SUMMARY OF THE INVENTION

It has now turned out possible to be able to obtain a quick joint having a swivel function but with maintained tightening properties, i.e., that male and female parts individually can be rotated in relation to each other.

DETAILED DESCRIPTION OF THE PRESENT INVENTION

The present invention is characterized in that the locking means are arranged in a rotatably arranged means, which is rotatably arranged in relation to the female part via a bearing, such as a ball or slide bearing.

In a preferred embodiment the female part comprises a rear, hose receiving part, which comprises a tubukar lead-through to allow passage of a medium.

In another preferred embodiment the lead-through has, in its one end a groove having a larger diameter than the lead-through as such.

In a further preferred embodiment the hose receiving part has on its outer side a first threaded part arranged to attach this hose receiving part to a swivel part.

In another preferred embodiment said swivel part consists of a substantially cylindrical, tubular part having an inward second thread at its rear end, which second thread is arranged to cooperate with said first thread to connect said two elements, hose receiving part and swivel part.

In a further preferred embodiment the swivel part receives in its one end an annular flange to be a resting plane partly for a slide sealing, partly for a substantially cylindrical, tubular bearing cup resting thereon.

In another preferred embodiment the substantially cylindrical, tubular bearing cup has a second annular flange to be a counter plane to said locking means.

In a further preferred embodiment the bearing is a slide bearing.

In another preferred embodiment the bearing is a ball bearing.

In a further preferred embodiment the bearing cup has a recess on its outer side and in one of its corner, which recess is intended to receive and cooperate with balls arranged in a ball bearing of the swivel.

In another preferred embodiment the bearing cup has an annular, semi-spherical recess on its inside for receiving said locking means segments.

In a further preferred embodiment the edge of the semi-spherical recess towards a central opening is a supporting edge of said elements.

In another preferred embodiment the swivel part has a semi-spherical groove in one of its inner corners to receive said ball bearing.

In a further preferred embodiment there is a resting plane between the semi-spherical groove and the central opening of the swivel part which plane is arranged to receive said slide sealing.

In another preferred embodiment said slide sealing is substantially flat, annularly designed and is provided with a number of U-shaped recesses, which are arranged to receive and maintain a number of balls present in the ball bearing.

By means of the present invention a complete rotation can be obtained in the quick connection as such.

BRIEF DESCRIPTION OF THE DRAWINGS

The present invention will now be described more in detail with reference to the accompanying drawing, however, without being restricted thereto. In the drawing

Figure 1:
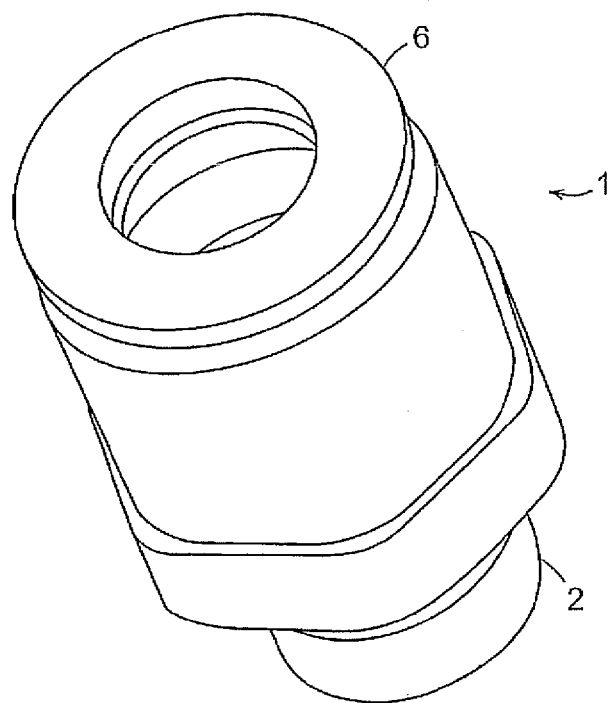
FIG. 1 shows a perspective view of the new joint according to the present invention.
Figure 2:
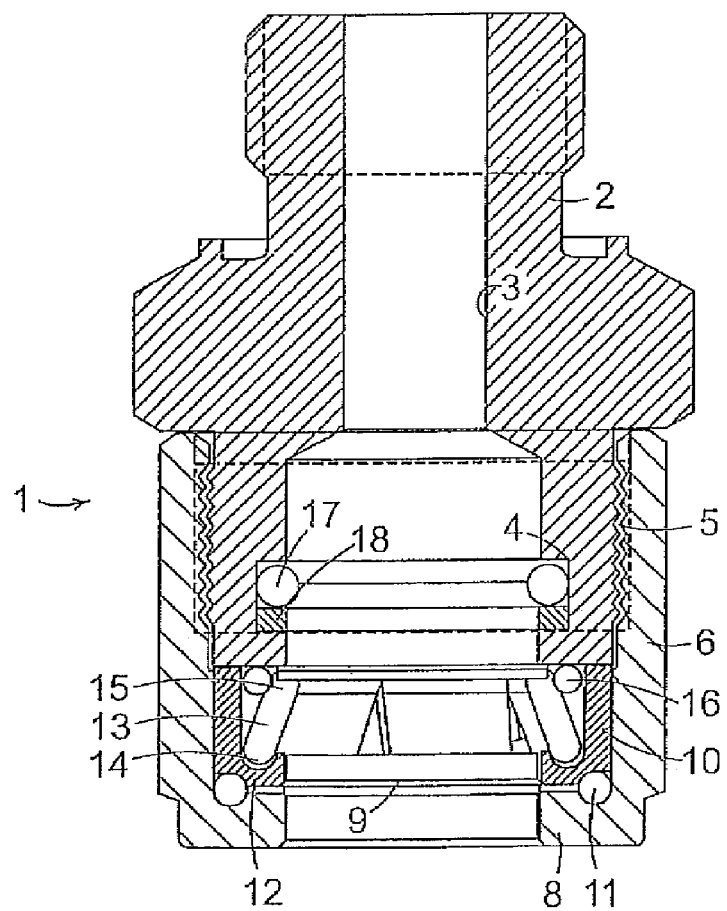
FIG. 2 shows a quick joint according to the present invention in a cross section through its longitudinal axis.
Figure 3:
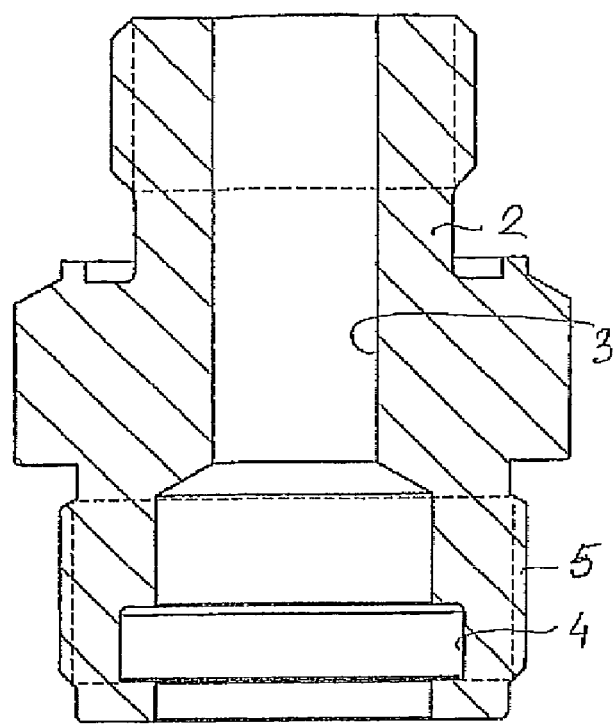
FIG. 3 shows a first detail of the invention in cross section through its longitudinal axis.

DETAILED DESCRIPTION OF THE INVENTION 1 denotes a female part comprising a rear, hose (not shown) receiving part 2 which comprises a tubular lead-through 3 to allow passage of a medium, such as hydraulic liquid. The lead-through 3 has in one of its ends, here called the front end, a groove 4 having a larger diameter than the lead-through itself. The hose receiving part 2 has a threaded part 5 on its outer side, which thread part is arranged to attach this hose receiving part 2 to a swivel part 6.

The swivel art 6 consists of a substantially cylindrical, tubular part having an inside thread 7 in its rear end, which thread 7 is arranged to cooperate with the thread 5 for join the two elements 2 and 6. The swivel part 6 has, in one of its ends, here called the forward end, an annular flange 8 intended to be a resting plane partly for a slide sealing 9, partly for a substantially cylindrical tubular bearing cup 10 resting thereon.

Between the swivel part 6 and the cylindrical, tubular bearing cup 10 a ball bearing 11 is arranged, besides the slide sealing 9. The ball bearing is held together, in this embodiment, by the slide sealing 9, which is also a bearing cage. The slide sealing 9 will be described more in detail in the following.

The substantially cylindrical, tubular bearing cup 10 has a second annular flange 12 intended to be a counter plane to locking elements 13 in the form of arc shaped segments having a semi circular resting surface 14 and a hook provided receiving surface 15. The arc shaped segments 15 rest against each other and are kept to each other by means of an elastic ring 16, which presses the segments 15 forwardly-outwardly. The arc shaped elements 13 are arranged to be engage with grooves in a male part introduced in the female part to retain the male part in the female part.

In the annular groove 4 there is further a sealing ring 17 being arranged together with a sealing washer 18. These are intended to cooperate with a male part (not shown) being introduced into the coupling.

Figure 4:
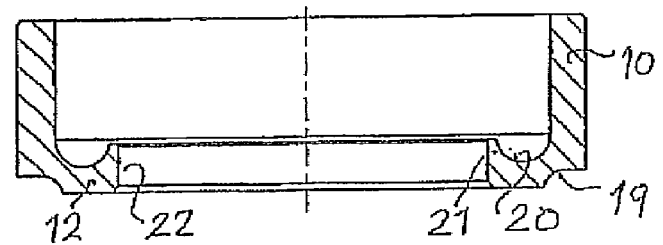
FIG. 4 shows a second detail of the invention in a cross section through its longitudinal axis.

FIG. 4 shows in detail the design of the bearing cup 10. As evident from the figure the bearing cup 10 has, on its outer side, in one of its corners, here called the forward corner, a recess 19 intended to receive and cooperate with balls of the ball bearing 11 arranged in the swivel. On its inside in the corresponding corner the bearing cup 10 has an annular, semi-spherical recess 20 to receive the locking means segments 13. The edge 21 of the semi-spherical recess 20 towards the central opening 22 is a supporting edge to the segments 13.

Figure 5:
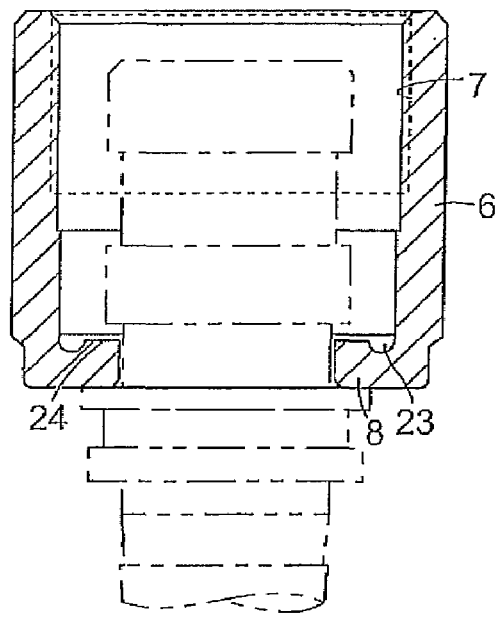
FIG. 5 shows a third detail of the female part in a cross section through its longitudinal axis.

FIG. 5 shows in detail the swivel part 6 which in its one corner, here called forward inner corner has a semi-spherical groove 23 to receive said ball bearing 11. Between said semi-spherical groove 23 and the central opening of the swivel part 6 there is a resting plane 24 arranged to receive said slide sealing 9.

Figure 6:
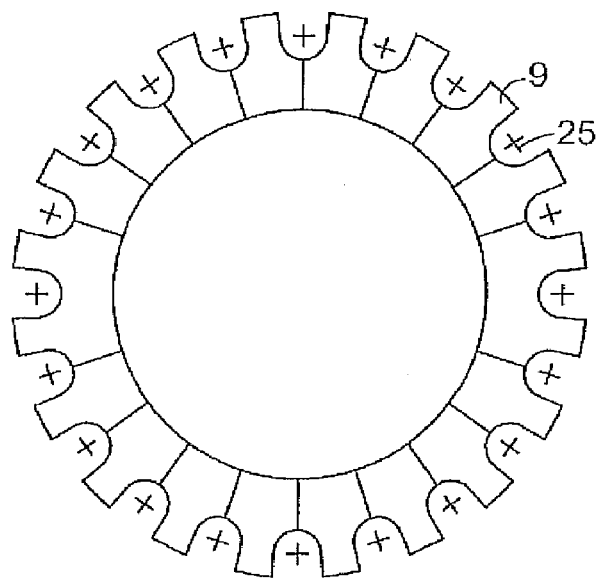
FIG. 6 shows in a view from above, a combined distance and ball washer according to the present invention.

In FIG. 6 said slide sealing 9 is shown more in detail. As evident from the figure the slide sealing 9 is substantially flat, annularly designed and is provided with a a greater number of U-shaped recesses 25 being arranged to receive and retain a number of balls present in the ball bearing 11. The material of the slide sealing can be a pressure resistant polymer such as made of TEFLON®. The polymer used should have good sliding properties to eliminate or reduce friction between the bearing cup 10 and the swivel part 6.

Figure 7:
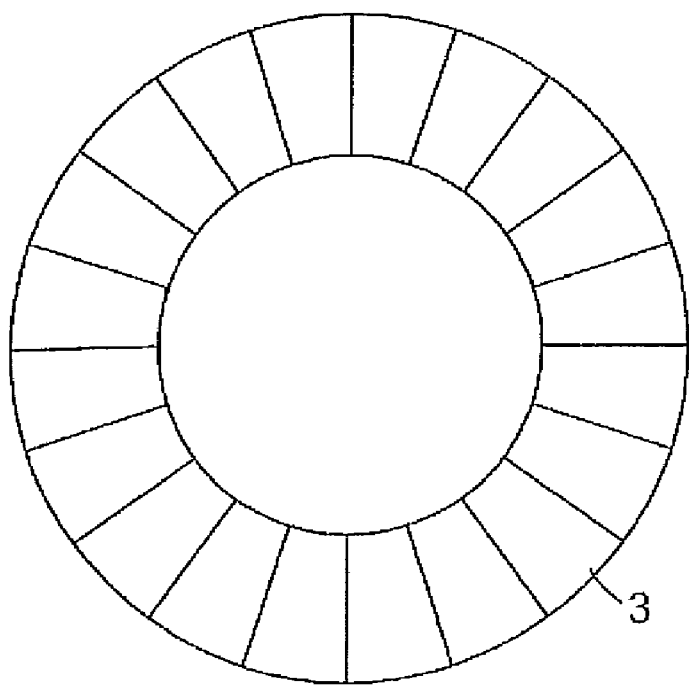
FIG. 7 shows in a view from above, a combined distance and slide bearing washer according to the present invention.

FIG. 7 shows an alternative embodiment of the bearing 11 in the form of a slide bearing where an annular distance and slide bearing washer is the slide sealing 9. The slide sealing 9 is hereby made of a durable polymer material.

Rear, hose receiving part 2, swivel part 6, bearing cup 10 and arc shaped segments 13 are all suitably made of metal, while sealing rings are made of oil and hydraulic liquid durable rubber and/or polymer materials.

The quick joint coupling is intended for hydraulic liquid coupling under very high pressures, such as up to 500 bars, often 100 to 500 bars, more often 250 to 425 bars. The quick joint coupling is often used in contractor machineries of different kinds as well as in ship constructions and in industry for hydraulic transfer of different forces and movements.

The invention claimed is:

1. A female quick joint coupling part for liquid tight joining of lines under high pressure comprising a sleeve shaped part into which a male part is introducible, said sleeve shaped part comprising a tubular lead-through having a first groove at one end of the lead-through in which a sealing ring and a washer are arranged, wherein the sleeve shaped part has a threaded part on its outside; said quick joint coupling further comprising a swivel part having a threaded part on its inside; wherein the threaded part on the outside of the swivel part is arranged to cooperate with an outside threaded art of the sleeve shaped art and thereby connecting the swivel part to the sleeve shaped part, said swivel part further comprising a tubular bearing cup and a slide sealing, said slide sealing comprising at least one ball bearing arranged within said slide sealing, said tubular bearing cup being rotatably arranged inside the swivel part by means of said ball bearing, and said tubular bearing cup comprising arc shaped locking elements arranged to be engaged with grooves in a male part.

2. A female quick joint coupling part according to claim 1, wherein the tubular lead-through allows passage of a medium.

3. A female quick joint coupling part according to claim 1, wherein the first groove has a larger diameter than the lead-through.

4. A female quick joint coupling part according to claim 1, wherein the swivel part has in its one end an annular flange arranged to be a resting plane partly for the slide sealing, and partly for the tubular bearing cup resting thereon.

5. A female quick joint coupling part according to claim 1, wherein the tubular bearing cup has a second annular flange arranged to form a counter plane to the locking elements.

6. A female quick joint coupling part according to claim 1, wherein the tubular bearing cup has a recess on its lower part of the outside wall, which recess is intended to receive and cooperate with balls arranged in a ball bearing of the swivel part.

7. A female quick joint coupling part according to claim 1, wherein the tubular bearing cup has an annular, semi-spherical recess on the lower part of its inside wall for receiving the arc shaped locking elements.

8. A female quick joint coupling part according to claim 7, wherein an edge of the annular semi-spherical recess facing a central opening forms a supporting edge to the arc shaped segments of the locking elements.

9. A female quick joint coupling part according to claim 1, wherein the swivel part on its inside has a semi-spherical groove at the bottom towards its outer wall arranged to receive the ball bearing.

10. A female quick joint coupling part according to claim 9, wherein a resting plane is arranged between the semi-spherical groove and a central opening of the swivel part to receive the slide sealing.

11. A female quick joint coupling part according to claim 1, wherein said slide sealing is substantially flat, annularly designed and is provided with a number of U-shaped recesses, which are arranged to receive and maintain a number of balls present in the ball bearing.

\* \* \* \* \*